(12) United States Patent  
Gietzold et al.

(10) Patent No.: US 8,643,217 B2
(45) Date of Patent: Feb. 4, 2014

(54) APPARATUS AND METHOD FOR BOOSTING OUTPUT OF A GENERATOR SET

(75) Inventors: Thomas Gietzold, Wethersfield, CT (US); Jeffrey J. Burchill, Syracuse, NY (US); Da Zhang, Manchester, CT (US); Weiqian Hu, Manchester, CT (US)

(73) Assignee: Carrier Corporation, Farmington, CT (US)

( * ) Notice: Subject to any disclaimer, the term of this patent is extended or adjusted under 35 U.S.C. 154(b) by 1017 days.

(21) Appl. No.: 12/674,936

(22) PCT Filed: Dec. 26, 2007

(86) PCT No.: PCT/US2007/088803
§ 371 (c)(1),
(2), (4) Date: Feb. 24, 2010

(87) PCT Pub. No.: WO2009/082407
PCT Pub. Date: Jul. 2, 2009

(65) Prior Publication Data
US 2011/0187199 A1 Aug. 4, 2011

(51) Int. Cl.
*H02J 3/00* (2006.01)
(52) U.S. Cl.
USPC .......................................................... 307/75

(58) Field of Classification Search
USPC ........................................................... 307/75
See application file for complete search history.

(56) References Cited

U.S. PATENT DOCUMENTS 7,105,938 B2   9/2006  Edelson
7,259,692 B1   8/2007  Eichenberg
7,538,451 B2 * 5/2009  Nomoto .......................... 307/66

OTHER PUBLICATIONS

International Preliminary Report on Patentability mailed Jul. 8, 2010.
Search Report and Written Opinion mailed on Jun. 10, 2008.

* cited by examiner

*Primary Examiner* — Hal Kaplan
(74) *Attorney, Agent, or Firm* — Carlson, Gaskey & Olds, PC

(57) ABSTRACT

An apparatus and method for boosting output of a generator set are provided. The output of the generator set is connected to an electrical load. The apparatus includes an energy storage unit, and a power-electronic unit. The energy storage unit uses batteries and capacitors to store electric energy. The power-electronic unit measures an electrical parameter of the output of the generator set. Based on the measured electrical parameter and a predefined criterion, the power-electronic unit determines additional energy required by the electrical load. Thereafter, the power-electronic unit supplies the additional energy to the electrical load. The additional energy is drawn from the energy storage unit.

22 Claims, 4 Drawing Sheets

APPARATUS AND METHOD FOR BOOSTING OUTPUT OF A GENERATOR SET

This application is a United States National Phase application of PCT Application No. PCT/US2007/088803 filed Dec. 26, 2007.

FIELD OF THE INVENTION

The invention relates generally to the field of generator sets. More specifically, the invention relates to an apparatus and method for boosting the output of a generator set, when power demand rises suddenly.

BACKGROUND OF THE INVENTION

Generator sets are devices that convert kinetic energy to electrical energy, generally using electromagnetic induction. These devices have application in various industrial and commercial areas. There are also many applications where usage of generator sets is necessary. For example, at a place, such as a hospital, where an uninterrupted power supply is required, generator sets are used as backups to provide power in case of a power failure. Another possible location is where electrical power is required on a vehicle, such as a food item transportation vehicle or an ice cream cart. Generator sets are also used to provide power to units requiring high electrical loads, such as refrigeration units.

One of the most widely used types of generator sets is the engine generator set. Typically, an engine generator set includes a generator, an engine and an engine control mechanism. The engine drives the generator to generate electricity. The speed of the engine governs the amount of electric power being generated. Based on the power required by the electrical load, the engine control mechanism regulates the speed of the engine and hence, the amount of electricity generated.

Generally, when the power demand is low, the engine runs at lower speeds that are sufficient to meet the requirement. However, when the power demand rises, the engine needs to be brought up to a higher speed to satisfy the increased requirement. Usually this rise in the power demand is sudden, and is accompanied by an increase in the load current. Since the engine is not able to speed up suddenly, the voltage at the generator unit drops. The engine control mechanism works towards increasing the speed of the engine and correspondingly, towards increasing the voltage. However, in certain cases, the voltage still drops to a level at which the generator or the load may trip, or even the engine may stop due to the inability to handle such a sudden demand. This can be especially harmful in case of refrigeration systems in which, such an event could trigger the refrigeration unit into a power down reset, thus resulting in a loss of adequate cooling or refrigeration need.

One way to solve the above problem is to keep the engine running at higher speeds even when the power demand is low. This would enable the engine to handle the sudden rise in power demand without tripping. However, this results in an increased consumption of fuel and is generally an inefficient way to tackle the given problem.

In light of the foregoing, there exists a need for a system that permits a generator set to handle a sudden increase in power demand efficiently. Further, the system should keep the generator set fuel-efficient. Moreover, the system should be dynamic in nature, cost effective and simple in design.

SUMMARY

An embodiment of the invention provides an apparatus for boosting output of a generator set. The output of the generator set is connected to an electrical load. The apparatus includes an energy storage unit and a power-electronic unit. The energy storage unit is configured to store electric energy. The power-electronic unit is configured to measure an electrical parameter of the output of the generator set. Further, the power-electronic unit is also configured to determine additional energy required by the electrical load, based on the measured electrical parameter and a predefined criterion. Moreover, the power-electronic unit is configured to supply the additional energy to the electrical load. The additional energy is drawn from the energy storage unit.

Another embodiment of the invention provides a method for boosting output of a generator set. The output of the generator set is connected to an electrical load. The method includes measuring an electrical parameter of the output of the generator set. Further, the method also includes determining the additional energy required by the electrical load, based on the measured electrical parameter and a predefined criterion. Moreover, the method includes supplying the additional energy to the electrical load when the predefined criterion is satisfied.

BRIEF DESCRIPTION OF THE DRAWINGS

The preferred embodiments of the invention will hereinafter be described in conjunction with the appended drawings, provided to illustrate and not to limit the invention, wherein like designations denote like elements, and in which.

DESCRIPTION OF EMBODIMENTS

Figure 1:
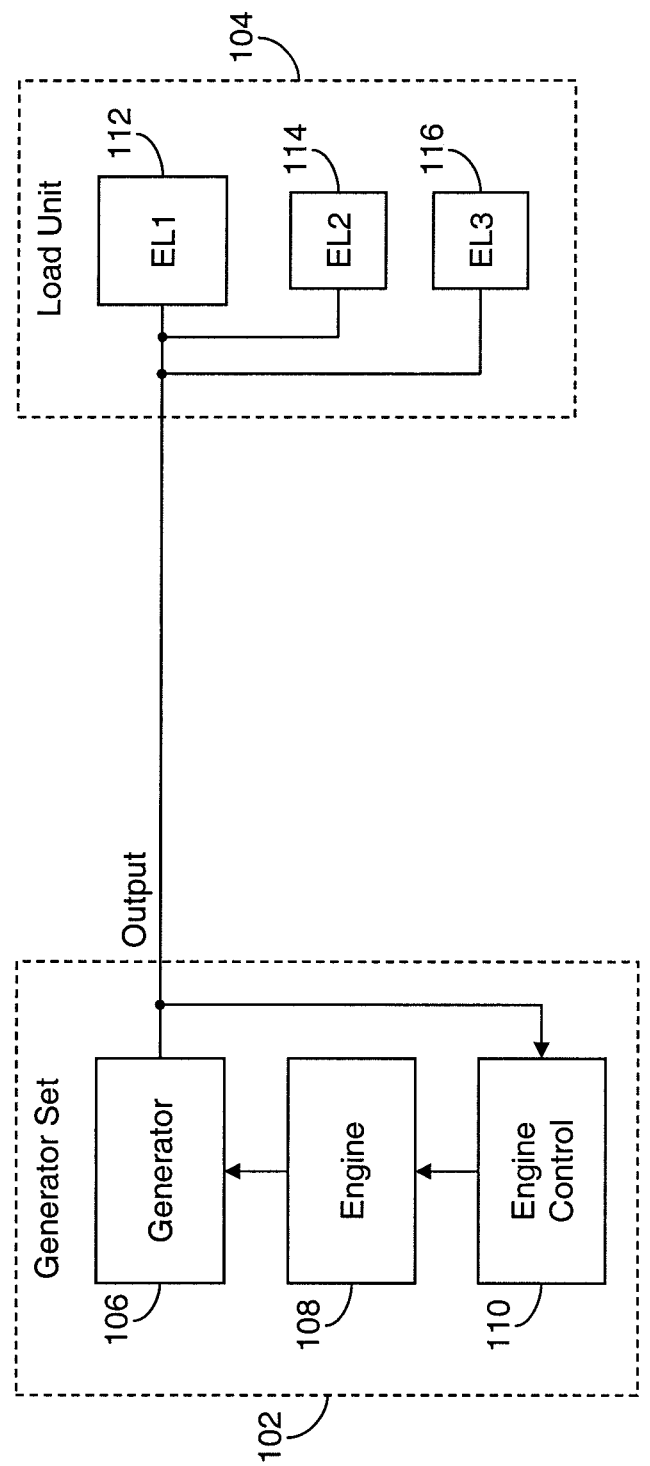
FIG. 1 illustrates an electrical system, where various embodiments of the invention may be practiced.

FIG. 1 illustrates an electrical system, where various embodiments of the invention may be practiced. The electrical system includes a generator set 102, and a load unit 104. Load unit 104 is connected to the output of generator set 102. Load unit 104 runs by using electricity generated by generator set 102.

Generator set 102 can further include a generator 106, an engine 108 and an engine control 110. Generator 106 is coupled to engine 108. Generator 106 is configured to generate electricity by converting kinetic energy generated by engine 108 into electrical energy. Examples of engine 108 include, but are not limited to, an internal combustion engine, a petrol engine and a diesel engine. The amount of kinetic energy generated by engine 108 is directly proportional to the speed at which engine 108 is running. Further, the amount of electricity generated by generator 106 is dependent on the amount of kinetic energy supplied to it. Therefore, it is evident that the amount of electricity generated by generator 106 is directly dependent on the speed at which engine 108 is running. Engine control 110 is connected to engine 108. Engine control 110 obtains feedback from generator 106 indicating the amount of electricity being generated, and regulates the speed of the engine 108 based on the feedback.

Load unit 104 can include multiple electrical loads. Examples of the electrical loads can include, but are not limited to, motors, compressors, refrigeration units, heating units, air conditioning units and electrical devices with high power requirements. For the purpose of this description, load unit 104 has been illustrated to include 3 electrical loads—an electrical load 112, an electrical load 114, and an electrical load 116. This example is merely provided for illustration purposes and is no way intended to limit the invention by the configuration therein.

Each of the electrical loads 112-116 has a power requirement and a voltage and current rating associated with it. For example, electrical load 112 can have a power requirement of 10 kVA and electrical loads 114 and 116 can have a power requirement of 3 kVA each.

Each of the electrical loads 112-116 is connected to the output of generator set 102. Electrical loads 112-116 function by using the electricity generated by generator set 102. Therefore, the combined load of the electrical loads drawing electricity at a point of time defines the power requirement for generator set 102 at that time. Generator set 102 is governed by engine control 110 to produce just the amount of electricity that is sufficient to meet the power requirement at that time.

Consider a scenario where the power demand suddenly rises. In light of the above example, consider that only electrical load 116 was drawing power from generator set 102. After some time, electrical loads 112 and 114 also start drawing power simultaneously. Therefore, the power requirement of generator set 102 jumps from 3 kVA to 16 kVA instantaneously. On detecting this change, engine control 110 instructs engine 108 to speed up, to satisfy the increased power requirement. However, since engine 108 is a mechanical component, it is unable to gain momentum instantaneously. Engine 108 begins to speed up gradually at the instant the load increases. Therefore, the electric power generated at that instant remains nearly the same as during the earlier low power requirement of 3 kVA. Due to this, the voltage at generator set 102 drops steeply. This drop in the voltage may cause generator set 102 to trip and thereby disengage load unit 104 from generator set 102. Alternately, a trip in load unit 104 may operate to disengage load unit 104 from generator set 102. Moreover, in one scenario, generator set 102 may stop working, as engine 108 could stall due to the inability to handle the excessive power demand suddenly.

Figure 2:
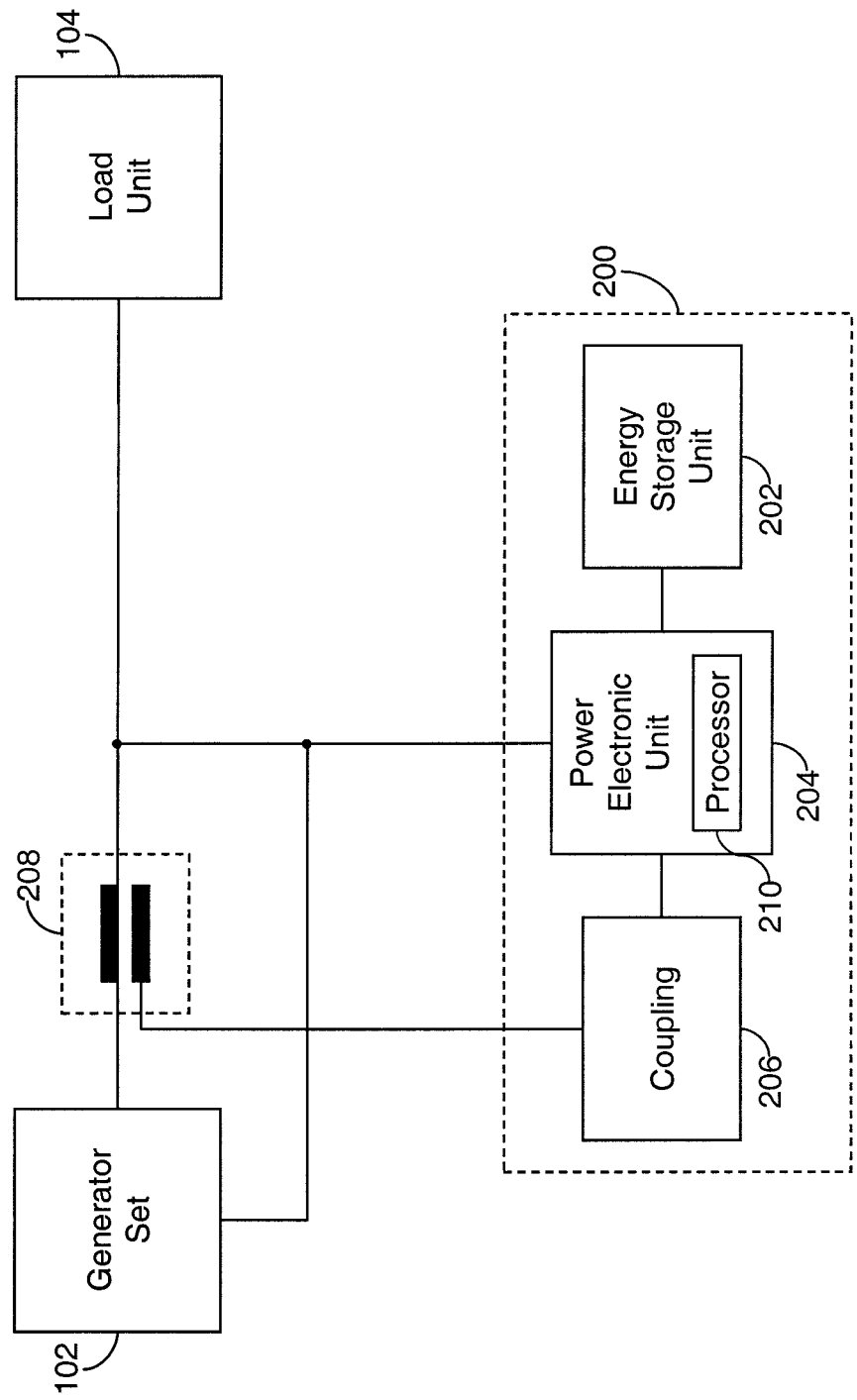
FIG. 2 illustrates a block diagram of an apparatus for boosting output of a generator set, in accordance with an embodiment of the invention.

The apparatus for boosting output of a generator set described in FIG. 2 helps generator set 102 handle such sudden increases in power demand and avert the associated failures.

FIG. 2 illustrates a block diagram of an apparatus 200 for boosting output of a generator set 102, in accordance with an embodiment of the invention. In various embodiments of the invention, the output of generator set 102 is a single phase output or a three phase output. For the purpose of this description, generator set 102 has been illustrated with a single phase output. Apparatus 200 has been shown in conjunction with generator set 102 and load unit 104 that have been described in conjunction with FIG. 1. This configuration of apparatus 200 coupled to generator set 102 is known as 'serial configuration' according to an embodiment of the invention. Apparatus 200 includes an energy storage unit 202, a power-electronic unit 204 and a coupling 206. Energy storage unit 202 is configured to store electric energy. For the purpose of storing electric energy, energy storage unit 202 can include devices that can store electric energy, for example, batteries and capacitors. However, it will be evident to a person skilled in the art that energy storage unit 202 can employ any other suitable device that can store electric energy.

Energy storage unit 202 is connected to power-electronic unit 204. Additionally, power-electronic unit 204 is coupled to generator set 102 through coupling 206. In the serial configuration, coupling 206 connects generator set 102 to power-electronic unit 204 by using a coupling transformer 208. Coupling transformer 208 has been shown outside coupling 206 only for the purpose of providing clarity, though it should be noted that it is a part of coupling 206. Coupling 206 can also include inductors and capacitors arranged suitably to shield apparatus 200 from high energy pulses that may cause damage to apparatus 200. Power-electronic unit 204 is directly connected to the output of generator set 102. Generator set 102 is also configured to receive feedback from the link that connects power-electronic unit 204 to generator set 102. This feedback may be used by engine control 110 to govern the functioning of engine 108.

Power-electronic unit 204 measures an electrical parameter of the output of generator set 102. In various embodiments of the invention, the electrical parameter is current, voltage or power demand of load unit 104. Power-electronic unit 204 may measure the electrical parameter via coupling 206 or through the direct link. In the serial configuration, coupling transformer 208 can measure the current at the generator output and communicate it to power-electronic unit 204 via coupling 206. Thereafter, power-electronic unit 204 can determine additional energy required by load unit 104, based on the measured electrical parameter and a predefined criterion. The predefined criterion can be the measured electrical parameter exceeding a first threshold value of the electrical parameter, the measured electrical parameter falling below a second threshold value of the electrical parameter or the measured electrical parameter following a predefined trend. An example of a predefined trend can include an increase in the current with a steep decline in the voltage. Power-electronic unit 204 initiates the process of determining additional energy only when the selected predefined criterion is satisfied.

The determination of the additional energy required will be based on the value of the measured electrical parameter. For example, let us consider that the power demand rises from 3 kVA to 16 kVA suddenly, and the current requirement jumps from 5 A to 15 A at a voltage of 220 V. However, due to the unavailability of enough power, only 6 A of current is supplied to load unit 104. Power-electronic unit 204 gets the reading of 6 A, and based on this reading, it determines that 13 kVA of additional power is required by load unit 104. In one embodiment of the invention, power-electronic unit 204 can include a processor 210 configured to determine the additional energy required. Processor 210 can also check if the predefined criterion is satisfied.

After the additional energy required has been determined, power-electronic unit 204 can supply the additional energy or a portion thereof to load unit 104. This additional energy can be drawn from energy storage unit 202. The additional energy may be supplied in current form or voltage form. In the current form, additional current is supplied and in the voltage form, additional voltage is supplied by power-electronic unit 204. In the serial configuration, power-electronic unit 204 can supply additional voltage to load unit 104 through the direct link to the output of generator set 102. This additional voltage ensures that sufficient power is present for the operation of load unit 104. In one embodiment of the invention, processor 210 can operate one or more switching devices to supply the additional energy to load unit 104. In an embodiment of the invention, semiconductor switches can be used as the switching devices.

Further, both engine control 110 and power-electronic unit 204 can function dynamically, based on their corresponding feedbacks. Engine control 110 will keep increasing the speed of engine 108 to the level at which the amount of electricity generated by generator set 102 is sufficient to handle the demand from load unit 104. Simultaneously, power-electronic unit 204 can supply the additional energy based on the determined requirement at each point of time. In one embodiment of the invention, power-electronic unit 204 can use the feedback from the direct link to the output of generator set 102 to determine the requirement at each point of time. Hence, this will ensure that load unit 104 has sufficient power to operate, while engine 108 speeds up to handle the increased load demand.

After having supplied additional energy, energy storage unit 202 would be drained by the amount of energy supplied, and need recharging. Therefore, in one embodiment of the invention, the output of generator set 102 is used to recharge energy storage unit 202. In another embodiment of the invention, an internal battery used to start generator set 102 is used to recharge energy storage unit 202. Further, processor 210 can be used to monitor energy level of energy storage unit 202, and to initiate charging of energy storage unit 202, when the energy level falls below a threshold value of the energy level.

Figure 3:
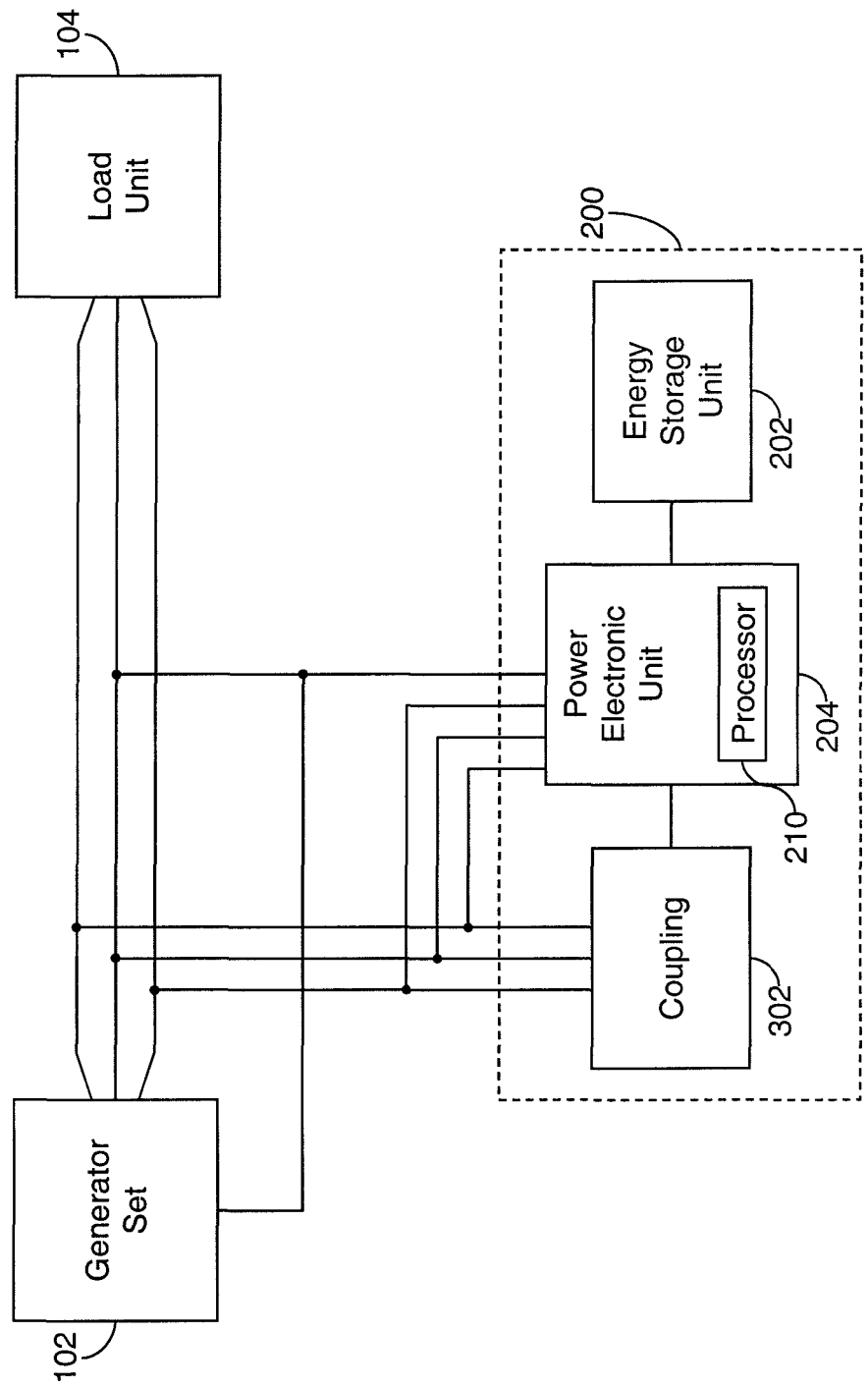
FIG. 3 illustrates a block diagram of an apparatus for boosting output of a generator set, in accordance with another embodiment of the invention.

FIG. 3 illustrates a block diagram of an apparatus 200 for boosting output of a generator set 102, in accordance with another embodiment of the invention. In various embodiments of the invention, the output of generator set 102 is a single phase output or a three phase output. For the purpose of this description, generator set 102 has been illustrated with a three phase output. Apparatus 200 has been shown in conjunction with generator set 102 and load unit 104 that have been described in conjunction with FIG. 1. This configuration of apparatus 200 coupled to generator set 102 is known as 'parallel configuration', according to an embodiment of the invention. Apparatus 200 includes energy storage unit 202, power-electronic unit 204 and a coupling unit 302. Energy storage unit 202 stores electric energy. It should be noted that the components from FIG. 2 should be read in conjunction with their description in FIG. 2.

Energy storage unit 202 is connected to power-electronic unit 204. Additionally, power-electronic unit 204 is coupled to generator set 102 through coupling 302. Coupling 302 can include inductors and capacitors in a suitable arrangement to shield apparatus 200 from high energy pulses that may cause damage to apparatus 200. Power-electronic unit 204 is directly connected to the output of generator set 102. Generator set 102 is also configured to receive feedback from the direct link. This feedback may be used by engine control 110 to govern the functioning of the engine 108.

Power-electronic unit 204 measures an electrical parameter of the output of generator set 102. In various embodiments of the invention, the electrical parameter is current, voltage or power demand of load unit 104. In the parallel configuration, power-electronic unit 204 can measure the voltage at the generator output via coupling 302. Thereafter, power-electronic unit 204 can determine additional energy required by load unit 104 based on the measured electrical parameter and a predefined criterion. The predefined criterion can be the measured electrical parameter exceeding a first threshold value of the electrical parameter, the measured electrical parameter falling below a second threshold value of the electrical parameter or the measured electrical parameter following a predefined trend. Power-electronic unit 204 initiates the process of determining additional energy only when the selected predefined criterion is satisfied.

The determination of the additional energy required will be based on the value of the measured electrical parameter. For example, let us consider that the power demand rises from 3 kVA to 16 kVA suddenly, and the current jumps from 5 A to 15 A. Due to the increase in current, the voltage drops from 220 V to 100 V, because of the unavailability of sufficient power to satisfy the demand. This drop in the voltage could cause generator unit 102 or load unit 104 to trip, or engine 108 may stop due to the inability to handle the sudden increase in power demand. Power-electronic unit 204 gets the reading of 100 V and based on this reading, it determines that 13 kVA of additional power is required by load unit 104 to keep the voltage at 220 V. Processor 210 can be configured to determine the additional energy required. Processor 210 can also check if the predefined criterion is satisfied.

After the additional energy required has been determined, power-electronic unit 204 can supply the additional energy required to load unit 104. The additional energy can be drawn from energy storage unit 202. The additional energy may be supplied in current form or voltage form. In the current form, additional current is supplied and in the voltage form, additional voltage is supplied by power-electronic unit 204. In the parallel configuration, power-electronic unit 204 can supply additional current to load unit 104 through coupling 302 to the output of generator set 102. This additional current can ensure that sufficient power is present for the operation of load unit 104 and the voltage is maintained at 220 V.

Further, both engine control 110 and power-electronic unit 204 can function dynamically based on their corresponding feedbacks. Engine control 110 will keep increasing the speed of engine 108 to the level at which the amount of electricity generated by the generator set 102 is sufficient to handle the demand from load unit 104. Simultaneously, power-electronic unit 204 can supply the additional energy based on the determined requirement at each point of time. In one embodiment of the invention, power-electronic unit 204 can use the feedback from the direct link to the output of generator set 102 to determine the requirement at each point of time. Hence, this will ensure that load unit 104 has sufficient power to operate, while engine 108 speeds up to handle the increased load.

After having supplied the additional energy, energy storage unit 202 would be drained by the amount of energy supplied and need recharging. Therefore, in one embodiment of the invention, the output of generator set 102 is used to recharge energy storage unit 202. In another embodiment of the invention, an internal battery used to start generator set 102 is used to recharge energy storage unit 202. Further, processor 210 can be used to monitor an energy level of the energy storage unit 202, and to initiate charging of energy storage unit 202, when the energy level falls below a threshold value of the energy level.

Figure 4:
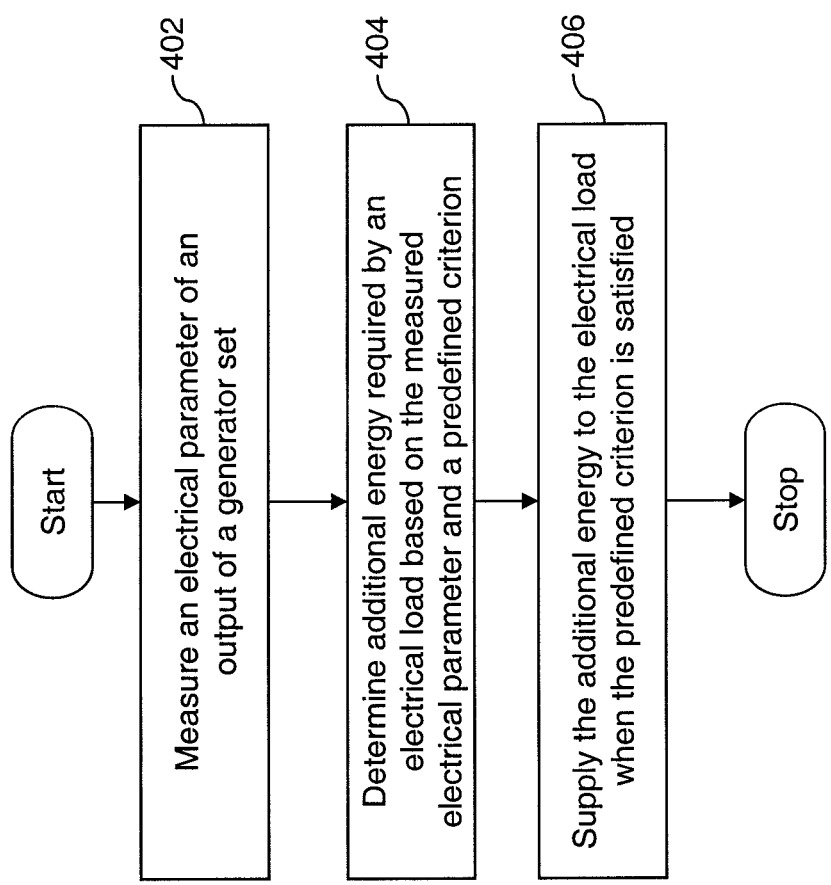
FIG. 4 is a flow diagram illustrating a method for boosting output of a generator set, in accordance with an embodiment of the invention.

FIG. 4 is a flow diagram illustrating a method for boosting output of a generator set 102, in accordance with an embodiment of the invention. The method is applicable to apparatus 200 connected to generator set 102 in both serial and parallel configurations. At step 402, an electrical parameter of an output of generator set 102 is measured. In one embodiment of the invention, the electrical parameter of the output of generator set 104 may be measured by power-electronic unit 204. The electrical parameter may be current, voltage or power demand of the electrical load.

At step 404, the additional energy required by load unit 104 is determined based on the measured electrical parameter, and a predefined criterion. In one embodiment of the invention, the additional energy required by load unit 104 is determined by the power-electronic unit 204. In another embodiment of the invention, the additional energy required by load unit 104 is determined by processor 210. The predefined criterion could be the measured electrical parameter exceeding a first threshold value of the electrical parameter, the measured electrical parameter falling below a second threshold value of the electrical parameter or the measured electrical parameter following a predefined trend.

At step 406, the additional energy is supplied to load unit 104, when the predefined criterion is satisfied. In one embodiment of the invention, the additional energy can be supplied by power-electronic unit 204. The additional energy can be supplied in at least one of a current form and a voltage form. In the current form, additional current is supplied and in the voltage form, additional voltage is supplied by power-electronic unit 204. Also, the additional energy supplied at step 406 may be drawn from an energy storage unit. The energy storage unit can be similar to energy storage unit 202 described in FIG. 2.

In one embodiment of the invention, the method can further include recharging the energy storage unit by using the output of generator set 102. Furthermore, the method can also include initiating charging of the energy storage unit, when energy level of the energy storage unit falls below a threshold value of the energy level.

Various embodiments of the invention provide an apparatus for boosting output of a generator set. The apparatus is capable of bridging the gap between the power production at the generator set and the power demand; in case of a sudden increase in the power demand. Therefore, the apparatus allows the generator set to handle a sudden increase in power demand efficiently.

Various embodiments of the invention provide an apparatus for boosting output of a generator set, which can be coupled to existing generator sets and does not require any changes to be made to the generator set.

Various embodiments of the invention provide an apparatus for boosting output of a generator set, which keeps the generator set fuel-efficient.

Various embodiments of the invention provide a method for boosting output of a generator set, which can be easily applied to make generator sets robust and more efficient.

Various embodiments of the invention provide an apparatus for boosting output of a generator set, which is cost effective and simple in design.

While the preferred embodiments of the invention have been illustrated and described, it will be clear that the invention is not limited to these embodiments only. Numerous modifications, changes, variations, substitutions and equivalents will be apparent to those skilled in the art, without departing from the spirit and scope of the invention, as described in the claims.

What is claimed is:

1. An apparatus for boosting output of a generator set, the output of the generator set being connected to an electrical load, the apparatus comprising:
    an energy storage unit configured to store electric energy; and
    a power-electronic unit configured to:
        measure an electrical parameter of the output of the generator set;
        determine additional energy required by the electrical load, while the electrical load is provided with electrical energy from the generator, the additional energy required based on the measured electrical parameter and a predefined criterion; and
        supply the additional energy to the electrical load, wherein the additional energy is drawn from the energy storage unit.

2. The apparatus according to claim 1, further comprising a coupling unit configured to couple the generator set to the power-electronic unit.

3. The apparatus according to claim 1, wherein the predefined criterion is the measured electrical parameter exceeding a first threshold value of the electrical parameter.

4. The apparatus according to claim 1, wherein the predefined criterion is the measured electrical parameter falling below a second threshold value of the electrical parameter.

5. The apparatus according to claim 1, wherein the predefined criterion is the measured electrical parameter following a predefined trend.

6. The apparatus according to claim 1, wherein the electrical parameter is selected from the group comprising a current, a voltage and a power demand of the electrical load.

7. The apparatus according to claim 1, wherein the energy storage unit comprises one or more battery.

8. The apparatus according to claim 1, wherein the energy storage unit comprises one or more capacitors.

9. The apparatus according to claim 1, wherein the output of the generator set is used to recharge the energy storage unit.

10. The apparatus according to claim 1, wherein the power electronic unit comprises a processor configured to check for the predefined criterion.

11. The apparatus according to claim 10, wherein the processor is further configured to operate one or more switching devices to supply the additional energy to the electrical load.

12. The apparatus according to claim 10, wherein the processor is further configured to:
    monitor an energy level of the energy storage unit; and
    initiate charging of the energy storage unit when the energy level falls below a threshold value of the energy level.

13. The apparatus according to claim 1, wherein the additional energy required is due to additional components within the electrical load coming online and requiring power.

14. A method for boosting output of a generator set, the output of the generator set connected to an electrical load, the method comprising:
    measuring an electrical parameter of the output of the generator set;
    determining additional energy required by the electrical load, while the electrical load is provided with electrical energy from the generator, the additional energy required based on the measured electrical parameter and a predefined criterion; and
    supplying the additional energy to the electrical load when the predefined criterion is satisfied.

15. The method according to claim 14, wherein the predefined criterion is the measured electrical parameter exceeding a first threshold value of the electrical parameter.

16. The method according to claim 14, wherein the predefined criterion is the measured electrical parameter falling below a second threshold value of the electrical parameter.

17. The method according to claim 14, wherein the predefined criterion is the measured electrical parameter following a predefined trend.

18. The method according to claim 14, wherein the electrical parameter is selected from the group comprising a current, a voltage and a power demand of the electrical load.

19. The method according to claim 14, wherein supplying the additional energy to the electrical load further comprises drawing the additional energy from an energy storage unit.

20. The method according to claim 19 further comprising recharging the energy storage unit by using the output of the generator set.

21. The method according to claim 19 further comprising initiating charging of the energy storage unit when an energy level of the energy storage unit falls below a threshold value of the energy level.

22. The method according to claim 14, wherein the additional energy required is due to additional components within the electrical load coming online and requiring power.

* * * * *